3,151,091
FREEZE RESISTANT LATEX
William R. Peterson and Ralph E. McNay, Baytown, Tex., assignors, by mesne assignments, to Ashland Oil & Refining Company, Ashland, Ky., a corporation of Kentucky
No Drawing. Filed May 11, 1960, Ser. No. 28,204
8 Claims. (Cl. 260—27)

This invention relates to paint latexes and water dispersion paint compositions containing such paint latexes. More particularly, it relates to a method of enhancing the freeze stability of such latexes and paint compositions and to the freeze stable compositions resulting therefrom.

In recent years, water dispersion paint compositions in which synthetic latexes prepared by emulsion polymerization are employed as binders have become widely accepted for both inside and outside applications. The advantages in application as well as the desirable characteristics of the resultant coatings or films are well recognized both within and without the paint manufacturing industry. Unfortunately, however, such paint compositions are also plagued by certain disadvantages not the least of which is their general inability to withstand reduced temperatures ranging from freezing to considerably below freezing. Under such temperature conditions, thickening or coagulation occurs rendering the compositions useless for coating purposes. An obvious but impractical solution to the problem is to maintain the temperature of such compositions above the freezing point. Both the latex and paint manufacturers, therefore, have been confronted with the necessity of improving the freeze resistance or freeze stability of paint latexes and paint compositions to an extent sufficient for such products to withstand naturally and frequently occurring low temperatures without detriment.

To this end, certain proposals have been made for improving this freeze resistance or freeze stability which have been employed with varying degrees of success. One such proposal involves any of various special techniques of polymerization whereby latexes are produced which are inherently more freeze resistant. Such techniques, of course, involve exceptionally close operational control which, as a practical matter, may not be possible to the extent necessary to continuously produce latexes of constant freeze resistant quality. A more practical and successful way of combatting the problem is by incorporating in the latex or paint a material found to impart freeze resistance thereto. One such class of materials found to be reasonably effective includes cetrain monohydroxy and polyhydroxy compounds. Another material found suitable for this purpose is a freeze resistant agent derived from the plant Grindelia. Both of these types of freeze resistant agents have proved generally effective in both paint latexes and water dispersion paint compositions prepared therefrom. However, in instances where such stabilized latexes and paint compositions are subjected to extended periods of unusually low temperatures or are subjected to repeated freezings and thawings, they do not appear to be as consistently effective as might be desired even when employed in relatively high concentrations.

Accordingly, there has been a continued demand for improved freeze resistant agents. It is a principal object of this invention, therefore, to meet this demand. It is a further object of this invention to provide an agent which is more consistently effective than either of the two classes of agents above described. A further object is to provide an agent which is economical, readily available, constant in quality and non-detrimental to water dispersion paint compositions in which it is incorporated. It is a still further object of this invention to provide a method for enhancing the freeze stability of paint latexes as well as the water dispersion paint compositions prepared therefrom. It is an additional object of this invention to provide a freeze stabilizing agent which is consistently effective at low concentrations and at excessively low temperatures particularly under conditions of repeated freezing and thawing.

In accordance with this invention, these objects have been met in a particularly effective manner. Surprisingly, it has been found that a combination comprising any of various hydroxyl compounds and a derivative of the plant Grindelia when added to a paint latex or to a water dispersion paint composition prepared therefrom results in an unexpected synergistic freeze stabilizing effect. More particularly, this improved freeze stabilizing effect is obtained by combining with a hydroxyl compound an extract of the plant Grindelia which is soluble in hydrocarbon solvents as well as in alcohols.

The plant Grindelia from which one of the components of the freeze stabilizing agent of this invention is derived belongs to the tribe Asteroideae of the natural family Compositae. The genus Grindelia includes some 25 species, six or eight of which are found in South America. The remainder occur in the United States mostly west of the Mississippi River, generally in semi-arid plateau regions. A particular prevalent plant in the United States is the specie *G. squarrosa*, commonly referred to as "curly cup gumweed." Other well known species are *G. humilis*, "marsh gumweed," *G. camporum*, "field gumweed," *G. robusta* and a South American variety *G. discoidea*. The various species are perennial or biennial and produce a sticky resinous substance on the stem and leaves and especially on the flower heads from which characteristic is derived the common name "gum plant" or "gum weed." Certain extracts of the plant have been shown to exhibit some utility in certain areas of the pharmaceutical field, but beyond this there has apparently been no further investigation of the plant for any purpose.

The component of the freeze stabilizing agent of the present invention that finds its origin in the plant Grindelia is derived therefrom by conventional extraction means. Thus, the finely pulverized plant including leaves, flower heads and stems is simply leached by percolating therethrough any common hydrocarbon solvent, such as VM&P naphtha. The extract is a soft, light amber colored acidic resinous substance which is substantially soluble in alcohol. This resinous substance may be employed in the form of a water soluble salt in combination with a hydroxyl compound to render both latexes and paint compositions freeze resistant. However, this resinous substance contains approximately 10% of an alcohol insoluble material which, if separated and discarded by subjecting the substance to further extraction, renders an even superior freeze resistant agent when combined with a hydroxyl compound. It is a preferred embodiment of this invention, therefore, to employ in combination with a hydroxyl compound a water soluble salt of a hydrocarbon solvent extract of the plant Grindelia which extract has been purified by further extraction with alcohol.

By water soluble salts as used herein is meant principally the alkali metal salts, particularly the sodium and potassium salts, including the ammonium salt. The salts of the resinous substance are readily prepared in a conventional manner by adding an aqueous solution of the preferred hydroxide of any convenient concentration to an aqueous dispersion of the resinous substance. The resultant mixture is agitated at room temperature until solution is complete. When combined with a hydroxyl compound for use in latexes or paint compositions, the aqueous salt solution may be used in varied concentrations but will generally be employed as a 10–25% aqueous solution.

The following example illustrates the extraction of the plant Grindelia and the saponification of the extract. All parts are by weight unless otherwise noted.

EXAMPLE 1

1000 parts of the whole plant *G. squarrosa* is pulverized with a hammer mill and subjected to extraction by simple percolation at room temperature with 2000 parts of commercially available VM&P naphtha. After 30 minutes, the resultant slurry is filtered and the filtrate subjected to distillation to remove the solvent, leaving 120 parts of a resinous substance. 100 parts of the resin is dissolved in 900 parts of methyl alcohol and the resultant slurry filtered to separate the the alcohol insoluble fraction. On distillation to remove the alcohol, 92 parts of purified resinous substance is obtained. 50 parts of the purified resinous substance is suspended in 200 parts of water, neutralized to a pH of 10–11 with 10% sodium hydroxide and agitated at room temperature for 10 minutes. Additional water is then added to give a 15% solution.

The hydroxyl compound which forms the other component of the synergistic freeze resistant agent of this invention may be any of those generally recognized to exhibit by itself a freeze stabilizing effect. Among these may be mentioned alcohols such as methanol, ethanol, n-propanol, isopropanol, n-butanol, sec-butanol, isobutanol and the like; alkyl Cellosolves such as methyl, ethyl and butyl Cellosolve; and glycols and their ethers such as ethylene glycol, diethylene glycol, triethylene glycol, propylene glycol, dipropylene glycol, tripropylene glycol, diethylene glycol ethylether, diethylene glycol butylether and the like. Of these, ethylene glycol is preferred for economic, handling and toxicity reasons.

The amount of freeze resistant agent employed in accordance with this invention may be quite widely varied. It has been found, for instance, that improved freeze resistance is imparted to paint latexes and paint compositions when using as little as about 0.5% by weight of the synergistic composition based on the weight of the polymer content of the latex. This amount may be considerably increased to as much as 15% but the use of the agent in amounts much beyond 15% is not warrented as a practical matter since little added advantage is gained. The usual practice will be to employ about 2.0–6.0% by weight of the polymer content of the latex in which range unusually stable paint latexes and paint compositions are obtained.

In order to produce the synergistic effect to its most optimum degree, it is preferable to employ the agent of this invention with its components in a ratio of at least about 7:3 parts by weight, either component being in the larger amount. Generally, the components will be employed in equivalent amounts since there is no practical advantage gained by the use of other ratios. Addition of the components as such or as a prepared aqueous mixture may be made to the latex at various stages of its preparation or to the paint composition prepared therefrom. Since the freeze resistant agent of this invention is equally effective in both, however, it is preferably incorporated in the latex at some stage in its preparation thereof so that full advantage of its unusual properties may be taken. Accordingly, the freeze resistant agent may be incorporated during emulsion polymerization or it may be added upon completion of polymerization. Alternatively, it may be added at any of various other points throughout the process of preparation such as prior to stripping of unreacted monomers. Preferably, however, the agent is added to the latex after it has been stripped of unreacted monomers and is ready for storage and/or shipment.

Synthetic latexes to which this invention is applicable are any of those latexes suitable for paint compositions which are prepared by the aqueous emulsion polymerization of a polymerizable ethylenic compound either with itself or with one or more different polymerizable ethylenic compounds. Examples of such ethylenic compounds are conjugated diolefins such as butadiene-1,3, methyl-2-butadiene-1,3, chloro-2-butadiene-1,3, piperylene, 2,3-dimethyl butadiene-1,3 and the like; aryl olefins such as styrene, vinyl naphthalene, α-methylstyrene, p-chlorostyrene, vinyl toluene, divinyl benzene and the like; α-methylene carboxylic acids, their esters, nitriles and amides such as acrylic acid, methyl acrylate, methylmethacrylate, acrylonitrile, methacrylonitrile, acrylamide, methacrylamide and the like; vinyl aliphatic compounds such as the vinyl halides, vinyl acetate, methyl vinyl ether, methyl vinyl ketone and the like; and vinylidene compounds such as the vinylidene halides.

While the present invention is particularly directed to improving the freeze resistance of paint latexes as above described including paint compositions prepared therefrom, additional advantages are gained by the use of the freeze resistant agent described herein. Thus, films or coatings prepared from paint compositions stabilized according to this invention quite unexpectedly exhibit superior film clarity, significantly improved adhesion properties as well as a distinctly better resistance to water spotting than is found in films and coatings not so stabilized. These unusual advantages are apparently attributable to the presence of the derivative of the plant Grindelia.

The following examples further illustrate the invention. In these examples, the test procedure comprises placing a sample of a paint latex or a water paint composition in a covered metal container and then placing the container in a refrigerated compartment for 16 hours at the test temperature. After 16 hours, the container is removed and the frozen contents permitted to thaw at room temperature. When the contents reach room temperature, they are observed for coagulation and viscosity variation. The contents are then resubjected to the same procedure until coagulation occurs or until four cycles are completed. All parts are by weight unless otherwise noted. The weight of freeze resistant agent being based on the polymer content of the latex.

EXAMPLE 2

A plurality of samples of a styrene-butadiene latex (67–33) are treated under the conditions above specified at temperaures of −7° C. and −29° C. Results appear in Table I.

*Table I*

| | Temp., °C. | Sample No. | | | | | |
|---|---|---|---|---|---|---|---|
| | | 1 | 2 | 3 | 4 | 5 | 6 |
| Polymer | | | 100 | 100 | 100 | 100 | 100 | 100 |
| Product of Ex. 1 | | | | 6 | | 4 | 2 | 3 |
| Ethylene glycol | | | | | 6 | 2 | 4 | 3 |
| No. of cycles for coagulum to appear. | −7 | 1 | 4 | 2 | >4 | >4 | >4 |
| | −29 | 1 | 4 | 2 | >4 | >4 | >4 |

The data of Table I illustrate the efficacy of the present invention. The latexes treated with the instant freeze stabilizing agent (Samples 4, 5 and 6) exhibit a superior degree of stability than do those latexes stabilized with either component thereof used alone in an equivalent amount. Moreover, this stability has been found to be consistently obtained which is not the case when employing either component separately, particularly the freeze resistant substance derived from the plant Grindelia.

EXAMPLE 3

The procedure of Example 2 is repeated using the product of Example 1 as the potassium salt. Similar results are obtained.

EXAMPLE 4

The procedure of Example 2 is repeated replacing ethylene glycol with equivalent quantities of methanol. Similar results are obtained for Samples 3–6. Coagulum appears earlier in Sample 2 at both temperatures, however.

EXAMPLE 5

The procedure of Example 2 is repeated using the additives in the amounts indicated below. Results appear in Table II.

*Table II*

|  | Temp., °C. | Sample No. | | | |
|---|---|---|---|---|---|
|  |  | 1 | 2 | 3 | 4 |
| Polymer | | 100 | 100 | 100 | 100 |
| Product of Ex. 1 | | | 5 | | 2.5 |
| Propylene glycol | | | | 5 | 2.5 |
| No. of cycles for coagulum to appear. | −7 | 1 | 4 | 2 | >4 |
|  | −29 | 1 | 4 | 2 | >4 |

The data of Table II illustrates again the synergistic effect obtained by the use of the freeze resistant agent of this invention (Sample 4). When the procedure is repeated numerous times, the excellent results shown above with respect to Sample 4 are consistently obtained while those obtained with respect to Samples 2 and 3 vary particularly to lesser degrees of stability.

EXAMPLE 6

The procedure of Example 2 is repeated using samples of Dow 512R, a commercially available styrene-butadiene latex of the Dow Chemical Company, and of Elvacet 81–900, a commercially available polyvinyl acetate latex of E. I. du Pont. Test temperature is −29° C. Results appear in Table III.

*Table III*

|  | Dow 512R | | | Elvacet 81–900 | | |
|---|---|---|---|---|---|---|
|  | 1 | 2 | 3 | 4 | 5 | 6 |
| Polymer | 100 | 100 | 100 | 100 | 100 | 100 |
| Product of Ex. 1 | 2 | | 1 | 2 | | 1 |
| Ethylene glycol | | 2 | 1 | | 2 | 1 |
| No. of cycles for coagulum to appear | 3 | 1 | >4 | 2 | 1 | >4 |

EXAMPLE 7

When the procedure of Example 6 is repeated replacing the product of Example 1 with saponified extracts of *G. camporum* and *G. robusta* as 15% aqueous solutions obtained according to the procedure of Example 1, similar results are obtained.

EXAMPLE 8

The following ingredients are thoroughly mixed and passed through a colloid mill.

| Ingredient: | Parts |
|---|---|
| Rutile (TiO$_2$) | 100 |
| Lithopone | 100 |
| Mica | 25 |
| Clay | 75 |
| Tetra sodium pyrophosphate | 2 |
| Casein solution | 192 |
| Pine oil | 4 |
| Water | 112 |

To this thoroughly milled slurry is added 425 parts of the latex of Example 5. Samples of the resultant paint composition are treated in the same manner as the latex in Example 5. Similar results are obtained illustrating the synergism derived when employing a mixture of the two additives.

The above examples illustrate the present invention in various of its aspects. It should be understood, however, that not only is it applicable to other paint latexes, but the freeze resistant component derived from the plant Grindelia may be an extract of any of the species, employed in the form of other water soluble salts. The hydrocarbon solvent soluble extract as previously indicated, moveover, need not be further extracted with an alcohol, although when the saponified form of the former is used, the results are not quite as outstanding.

We claim:

1. A freeze-stable latex comprising a synthetic polymer latex produced by emulsion polymerization and as a freeze-stabilizing agent about 0.5–15% by weight of the polymer content of the latex of a combination consisting essentially of a hydroxy compound selected from the group consisting of ethylene and propylene glycols and a hydrocarbon soluble extract of the plant Grindelia obtained by extracting said plant with a hydrocarbon, said hydrocarbon soluble extract being in the form of a salt selected from the group consisting of the alkali metal and ammonium salts, and said hydroxy compound and said extract being in a ratio by weight of about 7:3–3:7.

2. A freeze-stable latex comprising a synthetic polymer latex produced by emulsion polymerization and as a freez-stabilizing agent about 0.5–15% by weight of the polymer content of the latex of a combination consisting essentially of a hydroxy compound selected from the group consisting of ethylene and propylene glycols and a hydrocarbon soluble-alcohol soluble extract of the plant Grindelia obtained by extracting said plant with a hydrocarbon and then extracting the resulting hydrocarbon soluble extract with alcohol, said hydrocarbon soluble-alcohol soluble extract being in the form of a salt selected from the group consisting of the alkali metal and ammonium salts, and said hydroxy compound and said extract being in a ratio by weight of about 7:3–3:7.

3. A latex according to claim 1 in which said extract is obtained from the plant *Grindelia squarrosa* and said hydroxy compound is ethylene glycol.

4. A latex according to claim 1 in which the polymer is a styrene-butadiene polymer.

5. A freeze-stage water dispersion paint composition comprising a synthetic polymer latex produced by emulsion polymerization, a paint pigment and as a freeze-stabilizing agent about 0.5–15% by weight of the polymer content of a latex of a combination consisting essentially of a hydroxy compound selected from the group consisting of ethylene and propylene glycols and a hydrocarbon soluble extract of the plant Grindelia obtained by extracting said plant with a hydrocarbon, said hydrocarbon soluble extract being in the form of a salt selected from the group consisting of the alkali metal and ammonium salts, and said hydroxy compound and said extract being in a ratio by weight of about 7:3–3:7.

6. A freeze-stable water dispersion paint composition comprising a synthetic polymer latex produced by emulsion polymerization, a paint pigment and as a freeze-stabilizing agent about 0.5–15% by weight of the polymer content of a latex of a combination consisting essentially of a hydroxy compound selected from the group consisting of ethylene and propylene glycols and a hydrocarbon soluble-alcohol soluble extract of the plant Grindelia obtained by extracting said plant with a hydrocarbon and then extracting the resulting hydrocarbon soluble extract with alcohol, said hydrocarbon soluble-alcohol soluble extract being in the form of a salt selected from the group consisting of the alkali metal and ammonium salts, and said hydroxy compound and said extract being in a ratio by weight of about 7:3–3:7.

7. A composition according to claim 5 in which said extract is obtained from the plant *Grindelia squarrosa* and said hydroxy compound is ethylene glycol.

8. A composition according to claim 5 in which the polymer is a styrene-butadiene polymer.

References Cited in the file of this patent

UNITED STATES PATENTS

| | | |
|---|---|---|
| 2,384,910 | Hanson et al. | Sept. 10, 1945 |
| 2,444,396 | Collins et al. | June 29, 1948 |
| 2,556,575 | Cubberley et al. | June 12, 1951 |
| 2,822,341 | Miller et al. | Feb. 4, 1958 |
| 2,868,741 | Chambers et al. | Jan. 13, 1959 |
| 2,956,973 | Holdsworth | Oct. 18, 1960 |

OTHER REFERENCES

Martin et al. Journal of Agricultural Research, volume 42, No. 2, January 15, 1931, pages 57–69.

Singer Fundamentals, of Paint, Varnish & Lacquer Technology, 1957, American Paint Journal Company, pages 234–237.